Figure 1:
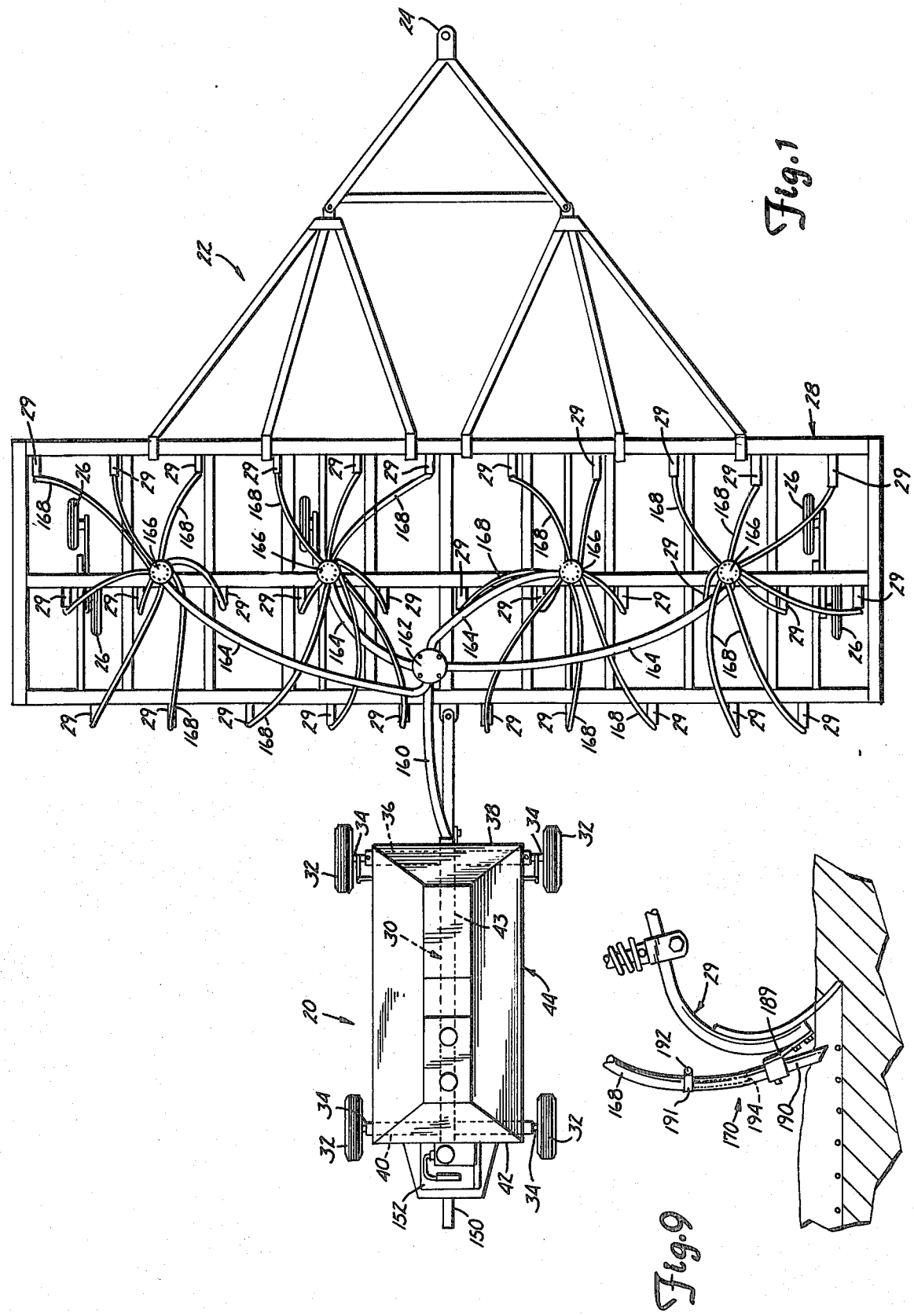

United States Patent [19]

Gust

[11] Patent Number: 4,473,016

[45] Date of Patent: Sep. 25, 1984

[54] PARTICULATE FEEDER SYSTEM

[75] Inventor: Jacob N. Gust, West Fargo, N. Dak.

[73] Assignee: Concord, Inc., Fargo, N. Dak.

[21] Appl. No.: 421,879

[22] Filed: Sep. 23, 1982

[51] Int. Cl.$^3$ ............................................. A01C 7/10
[52] U.S. Cl. ........................................ 111/86; 222/263;
239/651; 406/41; 406/68; 406/108; 406/185;
414/467
[58] Field of Search .............................. 111/1, 7, 34, 86;
414/467, 486, 527; 406/185, 38–41, 43, 123,
144, 130, 68, 108; 239/146, 148, 158, 675, 654,
655, 651; 222/142, 263, 76, 178, 193, 414

[56] References Cited

U.S. PATENT DOCUMENTS

| | | | |
|---|---|---|---|
| 279,034 | 6/1883 | Smith | 406/109 |
| 589,106 | 8/1897 | Weber | 406/39 |
| 738,816 | 9/1903 | Kindsvater | 111/52 |
| 1,095,136 | 4/1914 | Bahner | 111/77 |
| 1,589,684 | 6/1926 | Evans, Sr. | 406/39 |
| 2,011,133 | 8/1935 | Yoss | 221/136 |
| 2,026,732 | 1/1936 | Farley | 302/36 |
| 2,116,603 | 5/1938 | Holly | 406/109 |
| 2,432,437 | 12/1947 | Murphy | 111/34 X |
| 2,496,885 | 2/1950 | Milton | 111/77 |
| 2,619,767 | 12/1952 | Woock | 43/148 |
| 2,756,702 | 7/1956 | Brinton | 111/67 |
| 2,831,443 | 4/1958 | Walsh, Jr. | 111/13 |
| 3,060,872 | 10/1962 | Ackley | 111/67 |
| 3,308,774 | 3/1967 | Keeton | 111/77 |
| 3,398,662 | 8/1968 | Takata et al. | 239/675 X |
| 3,450,074 | 6/1969 | Gatzke et al. | 111/52 |
| 3,490,654 | 1/1970 | Fischer | 222/193 |
| 3,552,601 | 1/1971 | Hansen | 221/219 |
| 3,606,097 | 9/1971 | Wall | 222/176 |
| 3,618,820 | 11/1971 | Keeton | 221/219 |
| 3,626,877 | 12/1971 | Hansen | 111/85 |
| 3,631,825 | 1/1972 | Weiste | 111/11 |
| 3,633,522 | 1/1972 | Main | 111/69 |
| 3,656,661 | 4/1972 | Schumacher et al. | 406/144 X |
| 3,730,395 | 5/1973 | Gallogly et al. | 222/145 |
| 3,797,891 | 3/1974 | Fritz | 302/52 |
| 3,886,875 | 6/1975 | Ernst | 111/85 |
| 4,236,654 | 12/1980 | Mello | 222/630 X |
| 4,239,086 | 12/1980 | Yeager | 172/680 |
| 4,296,695 | 10/1981 | Quanbeck | 111/34 |
| 4,324,347 | 4/1982 | Thomas | 221/237 |
| 4,379,664 | 4/1983 | Klein et al. | 222/263 X |

FOREIGN PATENT DOCUMENTS

| | | | |
|---|---|---|---|
| 1097149 | 3/1981 | Canada | 111/34 |
| 1232915 | 11/1960 | France | 239/654 |
| 321361 | 4/1957 | Switzerland | 406/39 |
| 871261 | 6/1961 | United Kingdom | 111/34 |
| 596180 | 3/1978 | U.S.S.R. | 239/654 |
| 843810 | 7/1981 | U.S.S.R. | 111/1 |

Primary Examiner—James R. Feyrer
Attorney, Agent, or Firm—Kinney & Lange

[57] ABSTRACT

An agricultural particulate feeder controls the rate of particulate distribution to a surface being worked. The particlate feeder comprises a hopper with a sliding door over a discharge outlet at a lower end of the hopper. A frame supports the particulate feeder and has an elongated tube extending longitudinally under the discharge outlet of the hopper, the tube forming an element of the frame. A particulate metering cylinder is positioned between the outlet and door of the hopper and a particulate inlet in the elongated tube and is rotatably mounted on a drive shaft. A housing encases the cylinder and forms an enclosure connecting the hopper outlet and the tube inlet. One side of the housing is removable to allow lateral access to the metering cylinder inside the housing. In addition, longitudinal removal of the drive shaft permits lateral removal of the metering cylinder from the housing. The frame is movably supported on the ground and has a mechanism to rotate the particulate metering cylinder and a fan to force air through the elongated tube to provide a fluid medium for transporting particulate away from the hopper.

15 Claims, 11 Drawing Figures

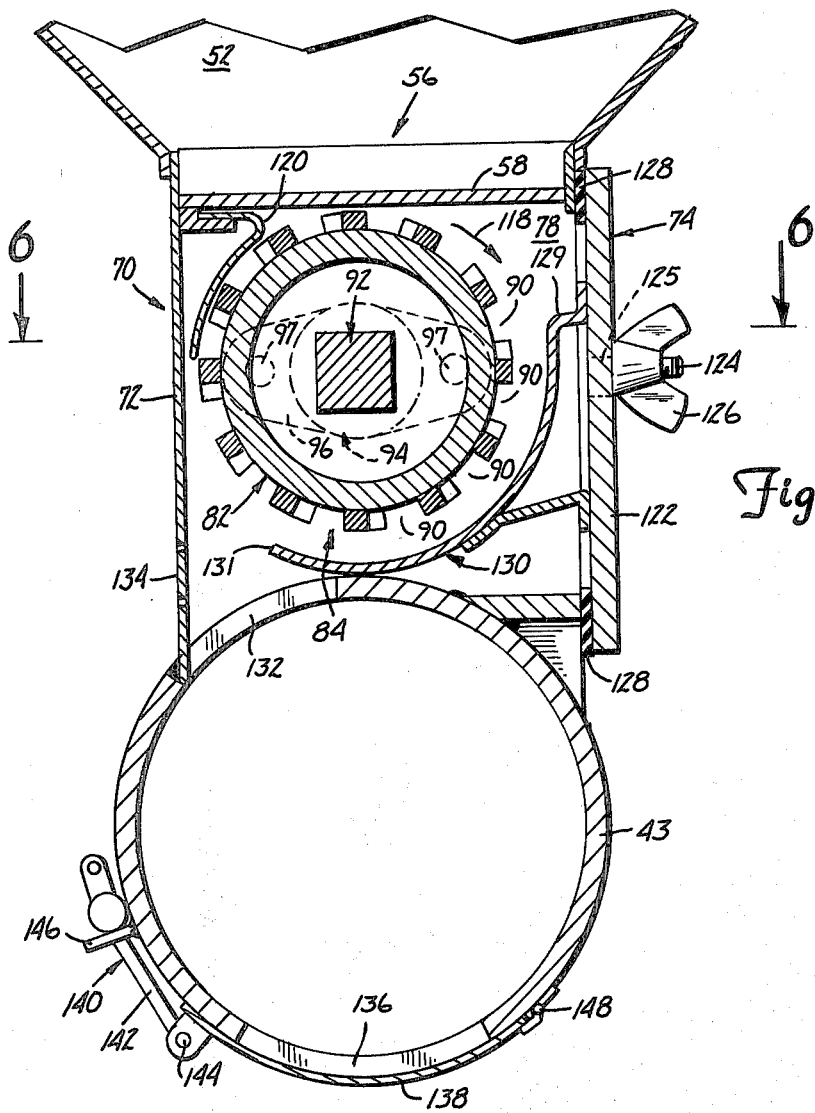
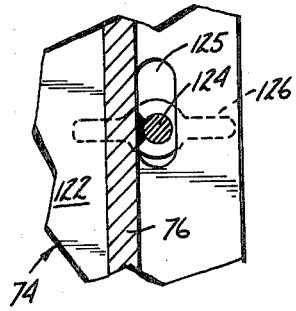
Fig.5
Fig.8
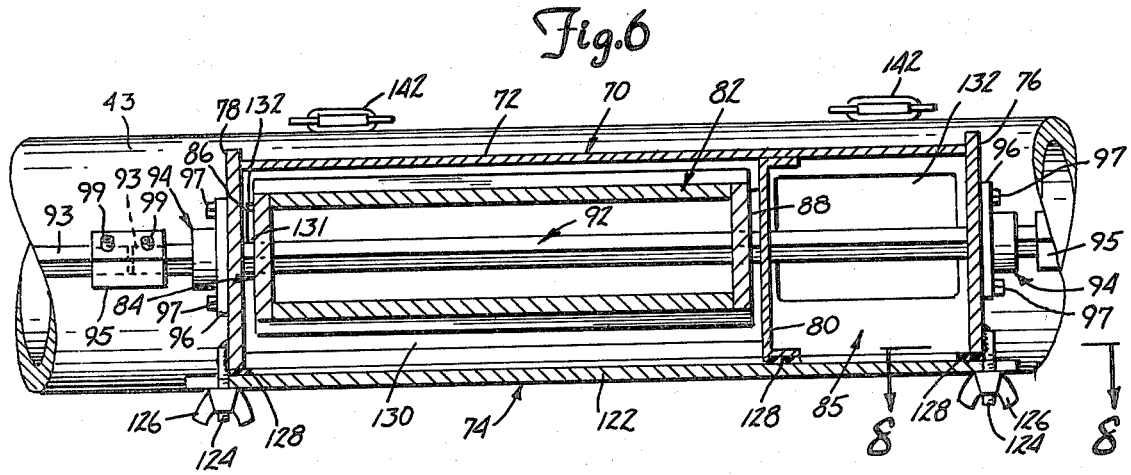
Fig.6

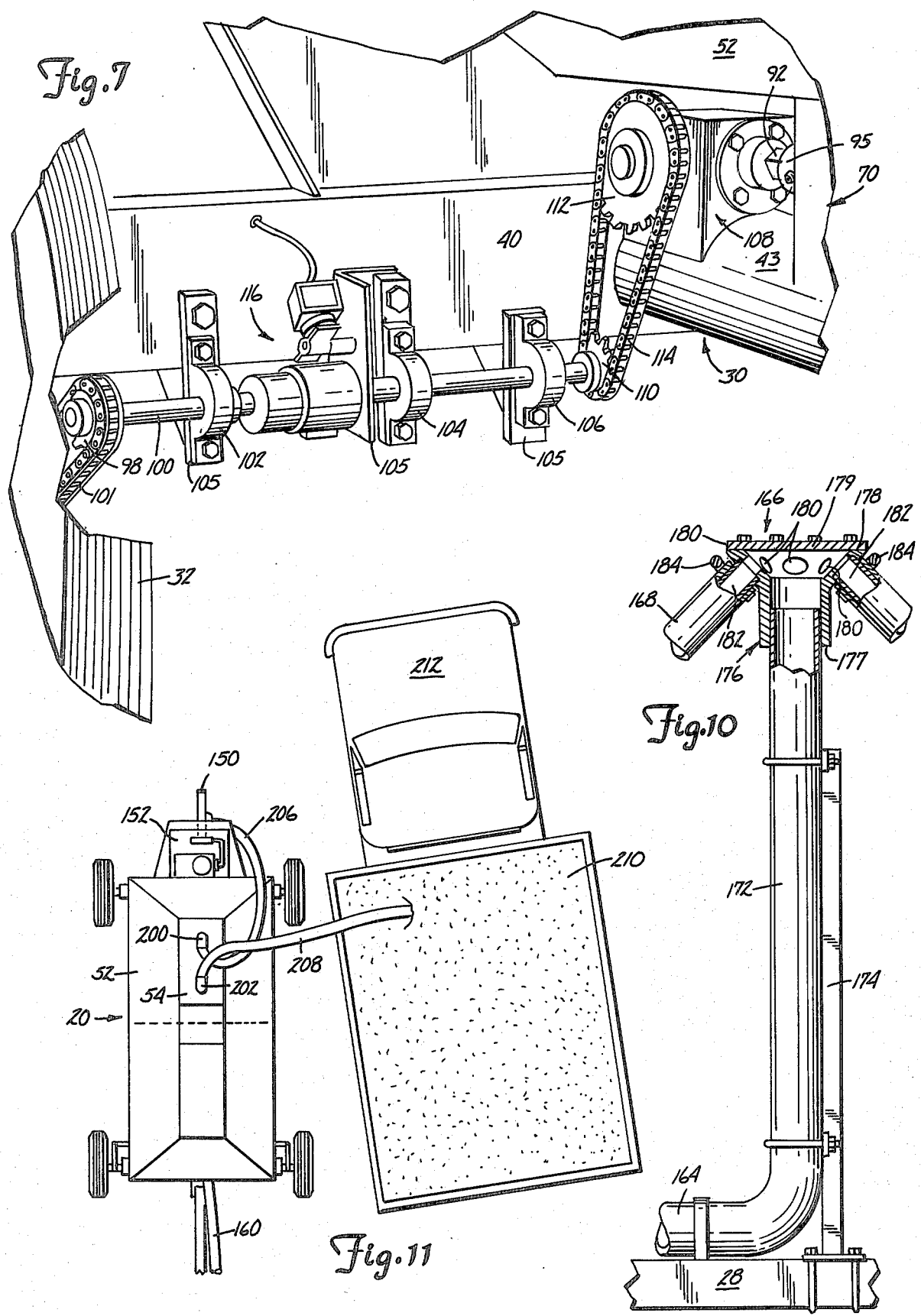

PARTICULATE FEEDER SYSTEM

BACKGROUND OF THE INVENTION

1. Field of the Invention

The present invention relates to agricultural implements, and particularly to forced air particulate feeders for controlling the rate of application of particulate to a surface being worked.

2. Description of the Prior Art

Uniformity in particulate distribution in agricultural uses, whether the particulate is seed, fertilizer or some other form of agricultural particulate, is very important to the efficient utilization of agricultural lands and the attainment of high crop outputs. A number of devices have been designed in an attempt to attain uniform distribution of seed or fertilizer upon the ground. Devices of this nature are shown in the following United States patents:

| Inventor | U.S. Pat. No. | Issue Date |
| --- | --- | --- |
| Thomas | 4,324,347 | 04/13/82 |
| Yeager | 4,239,086 | 12/16/80 |
| Ernst | 3,886,875 | 06/03/75 |
| Main | 3,633,522 | 01/11/72 |
| Hansen | 3,626,877 | 12/14/71 |
| Keeton | 3,618,820 | 11/09/71 |
| Hansen | 3,552,601 | 01/05/71 |
| Fischer | 3,490,654 | 01/20/70 |
| Gatzke et al | 3,450,074 | 06/17/69 |
| Keeton | 3,308,774 | 03/14/67 |
| Ackley | 3,060,872 | 10/30/62 |
| Brinton | 2,756,702 | 07/31/56 |
| Woock | 2,619,767 | 12/02/52 |
| Milton | 2,496,885 | 02/07/50 |

As some of these patents show, one means of controlling the distribution of particulate is by use of a metering wheel or cylinder which rotates and feeds a limited amount of particulate past its housing. Another method of metering particulate distribution is by providing a door over an opening in a particulate hopper which can be slidably adjusted to vary the size of the opening and thus the rate of particulate flow through the opening. These two metering devices are shown in U.S. Pat. No. 2,831,443 granted to Walsh, Jr. on Apr. 22, 1958; No. 2,011,133 granted to Yoss on Aug. 13, 1935; No. 1,095,136 granted to Bahner on Apr. 28, 1914; and No. 738,816 granted to Kindsvater on Sept. 15, 1903. Yoss also shows the use of a metering cylinder and sliding door as metering devices for introducing particulate into a stream of forced air.

The concept of transporting particulate by forced air in agricultural applications is not new, as shown in the following patents:

| United States Patents | | |
| --- | --- | --- |
| Inventor | U.S. Pat. No. | Issue Date |
| Quanbeck | 4,296,695 | 10/27/81 |
| Fritz | 3,797,891 | 03/19/74 |
| Gallogly et al | 3,730,395 | 05/01/73 |
| Weiste | 3,631,825 | 01/04/72 |
| Wall | 3,606,097 | 09/20/71 |
| Fischer | 3,490,654 | 01/20/70 |
| Farley | 2,026,732 | 01/07/36 |
| Evans, Sr. | 1,589,684 | 06/22/26 |
| Weber | 589,106 | 08/31/1897 |
| Foreign Patents | | |
| Country | Pat. No. Grantee | Pub. Date |
| United Kingdom | 871,261 Aktiebolaget Arvika-Verken | 06/21/61 |
| France | 1,232,915 Raynal | 11/07/60 |

In addition to these patented devices, Prasco Super Seeder Ltd. of Winnipeg, Manitoba, Canada, produces a "Super Seeder" device as shown in Prasco promotional brochures: (1) "Super Seeder—Now you've got it!"; (2) "Super Seeder 40/30"; and (3) "Super Seeder 75/55". The Prasco devices shown in these brochures employ forced air to transport particulate from a hopper into a distribution system.

Although not specifically directed to agricultural uses, additional devices designed to meter material or particulate distribution are shown in U.S. Pat. No. 3,542,250 granted to McRitchie on Nov. 24, 1970; No. 3,337,138 granted to Brown on Aug. 22, 1967; No. 2,300,682 granted to Mackle on Nov. 3, 1942; and No. 684,681 granted to Davis on Oct. 15, 1901.

A primary disadvantage of the metering devices and distribution systems shown in the prior art devices is their lack of versatility and lack of maintenance considerations. In all of the devices employing a metering wheel or cylinder, there is no way other than physically removing the wheel or cylinder to allow particulate to be emptied from the hopper through the opening adjacent the metering wheel or cylinder. If one of these prior art metering devices becomes jammed or damaged, its metering wheel or cylinder must be removed axially. None of the prior art devices are provided with means for relatively easy and quick removal of their respective metering wheel or cylinder for repair, adjustment or replacement. In addition, the housings of the prior art devices are not provided with means for observing the operation of the metering device either with or without particulate flowing through the metering device.

SUMMARY OF THE INVENTION

The particulate feeder system of the present invention overcomes the disadvantages and problems in the prior art by providing a dual control metering mechanism for controlling the rate of particulate entering a forced air distribution system. The metering mechanism of the present invention is observable in operation, easily accessible, simple of operation and manufacture, and provides means for quickly and easily emptying particulate from the hopper.

The present invention relates to an agricultural implement which comprises a particulate feeder for controlling the rate of application of particulate to the surface being worked. The particulate feeder comprises a particulate hopper having a particulate discharge outlet at a lower end thereof, with a sliding door over the discharge outlet which is variable in position to control the size of the particulate outlet. A particulate metering cylinder is rotatably mounted on a longitudinal axis under the sliding door and the particulate feeder has means for rotating the metering cylinder. The particulate feeder is supported on a frame which has an elongated tube extending longitudinally under the hopper with the tube having a particulate inlet aligned under the metering cylinder and discharge outlet. A housing encloses the metering cylinder and extends from the discharge outlet of the particulate hopper to the particulate inlet of the elongated tube to form an enclosure connecting the hopper discharge outlet and the tube particulate inlet. A side of the housing is selectively removable for lateral access to and removal of the metering cylinder. Means are provided for forcing air through the elongated tube to provide a fluid medium for transporting particulate away from the hopper and towards the surface being worked and the frame is provided with ground engaging means for movably supporting the particulate feeder.

The metering cylinder rotating means preferably comprises a cylinder drive shaft rotatably supported by bearings adjacent each end of the housing which passes slidably through the housing, the bearings, and the metering cylinder. The cylinder drive shaft is longitudinally removable so that upon withdrawal of the drive shaft, the metering cylinder can be laterally removed from the housing. Preferably the drive shaft is sectional to facilitate such longitudinal removal. For operation, the metering cylinder is operably affixed to the drive shaft to rotate when the drive shaft rotates, with the drive shaft being operably connected to a ground engaging wheel so that the speed of drive shaft rotation is dependent upon the speed of travel of the particulate feeder. A releasable clutch means is provided to permit selective disengagement of the translation of rotational motion from the ground engaging wheel to the drive shaft.

The removable side of the housing comprises a panel removably mounted on one side of the housing which has a curved portion on its inner side for guiding particulate into engagement with the metering cylinder. The panel is slidably adjustable on the housing for controlling the amount of particulate engaged by the metering cylinder. Thus, the rate of particulate distribution can be controlled either by varying the position of the sliding door or by varying the position of the curved portion of the panel relative to the metering cylinder. Since the rotation of the metering cylinder is dependent on the speed of travel of the particulate feeder, the rate of particulate metered by the metering cylinder into the distribution system is also controlled by changes in this rate of travel. The housing also has a plurality of transparent viewing windows on one side, with the windows being positioned so that the operation of the metering cylinder can be observed as particulate is metered into the particulate inlet of the elongated tube.

The metering cylinder does not extend the entire longitudinal length of the enclosure formed by the housing so that a portion of the enclosure is open to allow particulate to pass through the housing without being metered by the metering cylinder. The elongated tube has a discharge aperture and a door therefore aligned under the particulate inlet of the tube. Thus, particulate can be emptied out of the hopper by gravity directly through the open portion of the housing enclosure through the elongated tube inlet and discharge aperture.

A plurality of elongated ribs extend longitudinally from end to end on the outer side of the metering cylinder. The ribs define a plurality of elongated troughs so that a particulate engages the metering cylinder, the troughs allow only a defined amount of the particulate to be carried by the metering cylinder to the particulate inlet of the elongated tube. Since the speed of rotation of the metering cylinder is tied to the speed of travel of the particulate feeder, varying of the speed of travel varies the speed of rotation of the metering cylinder, which, in turn, varies the amount (per time period) of particulate metered by the metering cylinder into the elongated tube.

The elongated tube is preferably rigid and comnstitutes a portion of the frame supporting the particulate meter. Air is forced through the tube from one end to provide a fluid medium for transporting the particulate away from the hopper. At its other end, the tube is connected to a distribution tube of a distribution systm for dispensing the particule to the surface being worked. At least one manifold is positioned in the distribution tube to uniformly direct the air entrained particulate into aditional downstream portions of the distribution system and eventually to a plurality of surface applicators. The particulate feeder, in combination with the manifolds and surface applicators, provides means to uniformly dispense particulate to the surface being worked in a wide variety of concentrations, as desired.

For filling the particulate hopper with particulate, the hopper has two particulate ports adjacent its upper end. A vacuum tube is sealably connected between an air intake opening on the air forcing means and one of the particulate ports on the hopper so that when the air forcing means is operated, air is drawn through the vacuum tube to create a vacuum in the hopper. An intake tube is sealably connected at a first end to the other port on the hopper and has a second end positioned in a loose accumulation of particulate so that the vacuum created in the hopper draws the particulate through the intake tube and into the hopper. Thus, the particulate hopper can be easily cleanly and quickly filled with particulate to any desired level.

BRIEF DESCRIPTION OF THE DRAWINGS

FIG. 1 (Sheet 1) is a top plan view of the agricultural implement of the present invention hitched behind a particulate distribution implement.

FIG. 2 (Sheet 2) is a side elevational view of the particulate feeder of the present invention.

FIG. 3 (Sheet 2) is an enlarged fragmentary view of a portion of the metering devices of the particulate feeder.

FIG. 4 (Sheet 2) is a sectional view as taken along line 4—4 in FIG. 3.

FIG. 5 (Sheet 3) is a sectional view as taken along line 5—5 in FIG. 2.

FIG. 6 (Sheet 3) is a sectional view as taken along line 6—6 in FIG. 5.

FIG. 7 (Sheet 4) is an enlarged fragmentary perspective view of the drive mechanism for the metering cylinder of the present invention.

FIG. 8 (Sheet 3) is an enlarged fragmentary section as taken on line 8—8 in FIG. 6.

FIG. 9 (Sheet 1) is an enlarged fragmentary side view of the distribution system surface applicator in operation.

FIG. 10 (Sheet 4) is an enlarged fragmentary side view of the distribution system manifold with parts broken away and sectioned FIG. 11 (Sheet 4) is a top plan view of the particulate feeder of the present invention showing the operable connections for filling the particulate hopper with particulate.

DETAILED DESCRIPTION OF THE PREFERRED EMBODIMENTS

FIG. 1 shows an agricultural implement comprising a particulate feeder 20 of the present invention hitched to a particulate distribution implement 22, which is in turn hitched at its forward end 24 of a prime mover or tractor (not shown). The implements, as viewed in FIG. 1, would be pulled from left to right by the tractor. The particulate distribution implement 22 shown is a standard "deep tiller"-type implement which is movably supported on wheels 26 mounted under its frame 28 and has a plurality of spaced apart tillers 29 mounted under the frame 28 to engage and work the ground.

Figure 2:
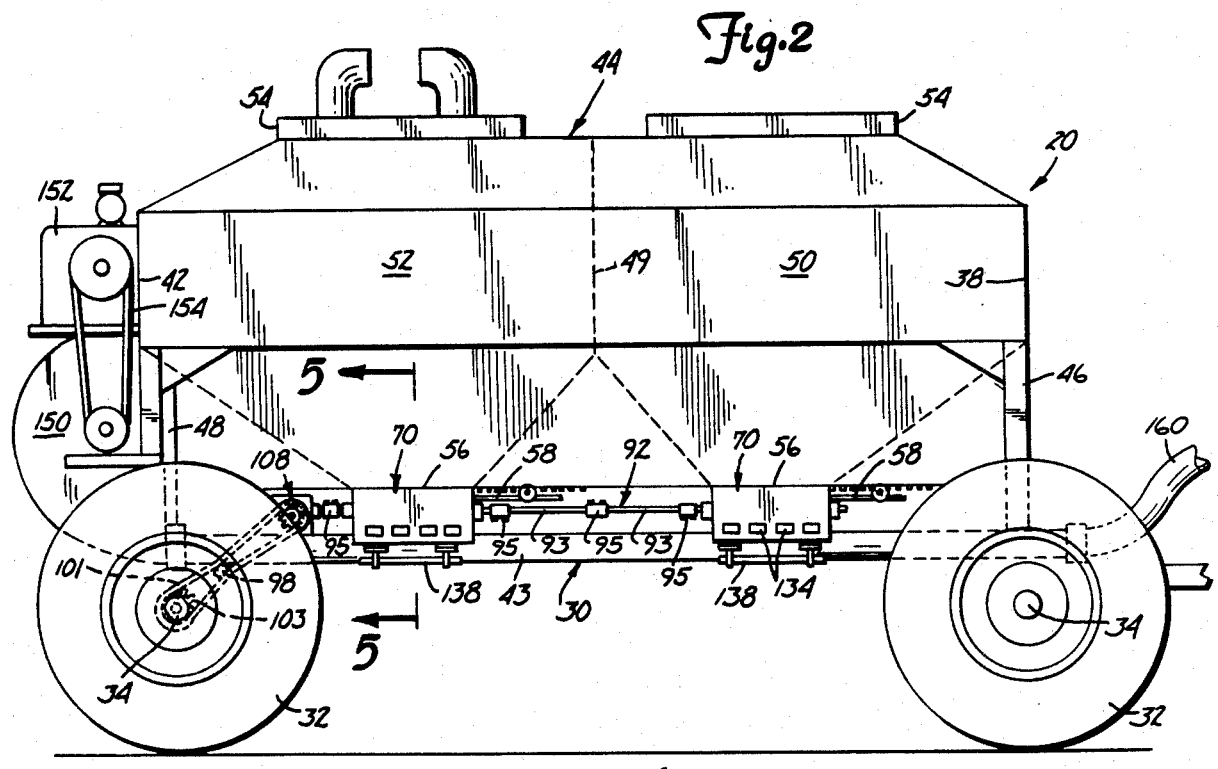

A main frame 30 supports the particulate feeder 20, with a plurality of ground engaging wheels 32 rotatably mounted on the main frame 30 to movably support the main frame 30 and particulate feeder 20 on the ground, as best shown in FIG. 2 (Sheet 2). Each wheel 32 is shafted on an axle 34 and suitable bearing means (not shown) are provided to allow the wheel 32 to roll freely. The axles 34 are mounted on laterally extending members 36 and 40 of the main frame 30 and aligned so that the wheels 32 track substantially parallel paths in operation. Laterally extending member 36 comprises a portion of the main frame 30 proximate a forward end 38 of the particulate feeder 20 and laterally extending member 40 comprises a portion of the main frame 30 proximate a rearward end 42 of the particulate feeder 20. In this description, "forward" and "rearward" are used to describe the relative components of the invention as viewed from right to left as in FIGS. 1 and 2. It is understood that the particulate feeder 20 could be operably hitched behind a tractor at either its forward end 38 or its rearward end 42 so that the use of these directional terms in this description is merely for discussion purposes.

A rigid elongated tube 43 extends longitudinally as the primary longitudinal portion of the main frame 30. The tube 43 extends from the forward end 38 to the rearward end 42 of the particulate feeder 20, with the laterally extending members 36 and 40 fixedly mounted perpendicularly thereto.

As shown in FIG. 2, a particulate container bin 44 is supported on the main frame 30 by forward and rearward support struts 46 and 48 (which are fixedly secured to the laterally extending members 36 and 40, respectively). As illustrated in FIG. 2, the particulate container bin 44 can be divided into a plurality of hoppers by positioning divider means such as a divider wall 49 within the container bin 44. The container bin 44 is thus divided into a forward hopper 50 and a rearward hopper 52. Each hopper is generally rectangular with an access door 54 at its upper end and sloped walls adjacent its lower end to form a rectangular funnel arrangement leading to a particulate discharge outlet 56.

Figure 3:
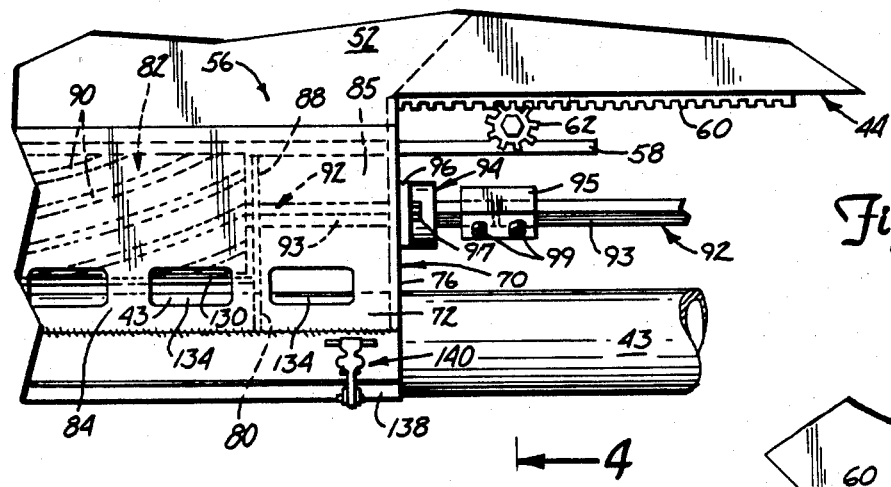
Figure 4:
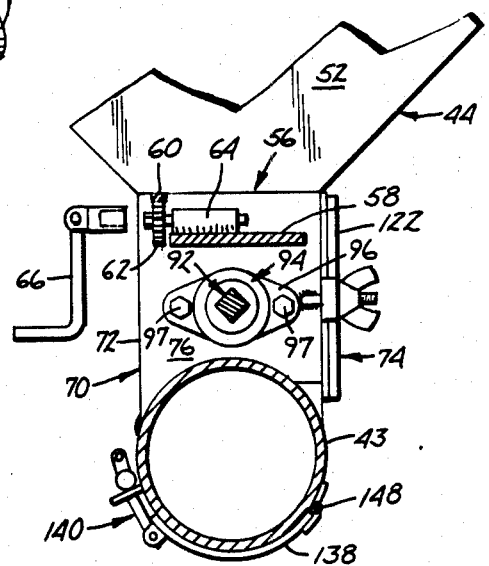

As shown in FIGS. 3–5 (Sheets 2 and 3), a sliding door 58 is mounted adjacent the discharge outlet 56 to selectively open and close the outlet 56 to the passage of particulate. Each sliding door 58 is provided with means for moving the sliding door relative to the particulate outlet 56 so that the position of the door 58 is selectively variable from a first open position to a second closed position to control the size of the particulate outlet 56. Preferably, the moving means comprises a rack and pinion-type arrangement wherein a rack 60 is mounted on the particulate container bin 44 and a pinion 62 is rotatably mounted in a sleeve 64 secured to each door 58. The teeth of the pinion 62 are aligned with the teeth of the rack 60 so that rotation of the pinion 62 on its shaft moves the door 58 relative to the particulate outlet 56.

As viewed in FIG. 3, a clockwise rotation of the pinion 62 causes the door 58 to move to the left and cover or close the particulate outlet 56. Rotation of the pinion 62 in a counterclockwise direction moves the door 58 to the right and opens the particulate outlet 56. As illustrated in FIG. 4, a crank means 66 can be selectively secured upon the pinion 62 to facilitate rotation of the pinion 62 to open or close the sliding door 58. The sliding door 58 is dimensioned to fully seal the discharge outlet 56 when in its closed position to prevent particulate from passing through the outlet 56.

A housing 70 extends from the discharge outlet 56 of each hopper to the elongated tube 43, as shown. The housing 70 is generally rectangular in horizontal cross section and corresponds to the rectangular opening defined by the particulate outlet 56. As shown in FIG. 6 (Sheet 3), the housing has longitudinal side walls 72 and 74 and transverse end walls 76 and 78. The enclosure formed by the housing 70 is subdivided into first and second chambers 84 and 85, respectively, by a generally vertical wall 80, as shown in FIGS. 3 and 6.

A particulate metering cylinder 82 is rotatably mounted on a longitudinal axis in the first chamber 84 in the housing 70. The metering cylinder 82 has a first end 86 and a second end 88 defining a longitudinal axis of rotation for the metering cylinder 82. A plurality of elongated ribs 89 extend from the first end 86 to the second end 88 of the metering cylinder on its outer cylindrical side, as best shown in FIG. 5. The ribs 89 define a plurality of elongated troughs 90 therebetween. Preferably, the elongated troughs 90 on the outer side of the metering cylinder 82 are slanted relative to the longitudinal axis of rotation of the metering cylinder 82 (as shown in FIG. 3) to facilitate the metering of particulate in a more orderly and uniform fashion by the particulate metering cylinder 82.

As stated, the metering cylinder 82 is rotatably mounted on its longitudinal axis. A cylinder drive shaft 92 is rotatably supported by bearing collars 94 adjacent each end of the housing 70. Each bearing collar 94 is secured to its respective end wall 76 and 78 of the housing 70 by a bearing mount plate 96 and suitable fasteners 97 which allow rotation of bearing collars 94. The drive shaft 92 passes through the metering cylinder 82 from its first end 86 to its second end 88 and passes completely through the housing 70 longitudinally (both chambers 84 and 85), as shown in FIG. 6. Preferably, the drive shaft 92 is comprised of a plurality of drive shaft sections 93. The shaft sections 93 are secured end to end along a single axis of rotation, as best shown in FIGS. 2, 3 and 6, by suitable fastening means, such as a plurality of connecting collars 95. Each connecting collar 95 has two fasteners, such as screws 99, to secure the collar 95 to adjoining ends of the shaft sections 95.

The metering cylinder 82 is mounted on the drive shaft 92 to rotate with the drive shaft 92 when it is rotated. As shown, one way to accomplish this coupled rotation is by use of a square drive shaft (in cross section) fitted in a square passageway in the metering cylinder 82. Other means of obtaining coupled rotation between the drive shaft 92 and metering cylinder 82, such as using a keyway on the shaft, are also possible.

In the preferred embodiment, the drive shaft 92 is rotatably driven off of one of the wheels 32 of the particulate feeder 20. As shown in FIGS. 2 (Sheet 2) and 7 (Sheet 4), a drive gear 98 engages an endless chain 101 which engages a drive sprocket 103 axially secured on one of the wheels 32 (as best shown in FIG. 1). Rotation of the wheel 32 rotates the drive sprocket 103 which drives the chain 101 to rotate the drive gear 98. The drive gear 98 is, in turn, secured to a drive rod 100 which is rotatably mounted on bearing means 102, 104 and 106. The bearing means are mounted on brackets 107 secured to one of the laterally extending members (such as member 40) of the main frame 30. The drive rod 100 is operably connected to a right angle gear box 108 by means of circular gears 110 and 112 and endless chain 114. The right angle gear box 108 causes rotation of the drive rod 100 to rotate drive shaft 92 by standard means (not shown).

A releasable clutch means 116 is provided on the drive rod 100 to permit the selective disengagement of the translation of rotational motion from the wheel 32 to the drive shaft 92. The releasable clutch means 116 is preferably a standard solenoid driven-type clutch, which is actuated by a remote power source and switching means so that rotation of the drive shaft 92 can be controlled by an operator in a remote location, such as a tractor cab. As shown in FIG. 2, a single drive shaft 92 can rotate more than one metering cylinder 82, as long as the metering cylinders are aligned on a common rotational axis. Of course, other means of rotating the drive shaft 92, such as an electric or hydraulic motor, are also possible.

FIG. 5 shows the configuration (in lateral cross-section) of the first chamber 84 of the housing 70. The metering cylinder 82 is mounted under the sliding door 58 and rotates on the drive shaft 92 in a clockwise direction as shown by arrow 118 (as viewed in FIG. 5). A particulate shield 120 is mounted adjacent an upper edge of the longitudinal side wall 72 of the housing 70 and extends the full longitudinal length of the first chamber 84 and covers a limited arcuate range of the outer side of the metering cylinder 82 sufficient to prevent particulate flow against rotation of the metering cylinder 82. The particulate shield 120 prevents particulate from flowing downwardly against the rotation of the metering cylinder 82 and guides the particulate into the troughs 90 of the metering cylinder 82.

The longitudinal side wall 74 of the housing 70 has a removable panel 122 extending its full longitudinal length, as shown in FIG. 6. The panel 122 is secured to the housing 70 by quick removing fastener means, such as threaded rods 124 and wing nuts 126. Sealing means, such as a gasket 128 is provided on the inner surface of the panel 122 to prevent leakage of particulate from the chambers of the housing 70 when the panel 122 is secured in place. The threaded rods 124 are fixedly secured to the end wall 76 and 78 of the housing 170 to extend laterally through generally vertical slots 125 in the removable panel 122 (see FIG. 8, Sheet 3). Thus, the panel 122 is slidably adjustable on the housing 70.

Mounted on the inner side of the panel 122 is a curved particulate guide portion 130 for maintaining and guiding particulate into engagement with the metering cylinder 82. The guide portion 130 is curved from a particulate contact end 129 to a particulate drop end 131 to correspond to the curve of the outer cylindrical side of the metering cylinder 82 and regulate the amount of particulate engaged by the metering cylinder 82. Because of the slots 125, the position of the guide portion 130 is adjustable relative to the metering cyliner 82 to aid in controlling the amount of particulate engaged by the metering cylinder 82.

The removable panel 122 not only provides acces to the interior of the housing 70 and to the metering cylinder 82, it also provides a means for removing the metering cylinder 82 from the housing 70. The metering cylinder 82 is slidably mounted upon the drive shaft 92. The drive shaft 92 is slidably mounted in its bearing collars 94 and housing 70 so that longitudinal removal of the drive shaft 92 from the housing 70 withdraws the drive shaft 92 from the metering cylinder 82 to permit lateral removal of the metering cylinder 82 through the opening in the longitudinal side wall 74 of the housing 70 when the panel 122 is removed. This feature allows for easy and quick removal of the metering cylinder 82 for replacement or repair. In addition, when the removable panel 122 is removed, access is gained to the metering cylinder 82 while it is rotating on the drive shaft 92 in order to observe the metering cylinder 82 during operation. When the sliding door 58 is moved to its closed shut position, this feature is particularly advantageous in that the metering device of the present invention can be repaired, replaced or unclogged while the hopper above it is full of particulate.

Longitudinal removal of the drive shaft 92 is easily accomplished because of its sectional nature. The fasteners on the connecting collars 95 are loosened to allow the collar 95 to slide longitudinally on the shaft sections 93. By moving the collars 95 on both ends of one of the shaft sections 93 that does not pass through the housing 70, that shaft section 93 can be withdrawn laterally to permit the shaft section or sections 93 that do pass through the housing to be withdrawn longitudinally.

The elongated tube 43 has a particulate inlet 132 extending longitudinally adjacent its upper side under both chambers 84 and 85 of the housing 70, as shown in FIGS. 5 and 6. The portion of the particulate inlet 132 under the first chamber 84 is positioned below the particulate drop end 131 of the guide portion 130 so that as particulate is metered past the drop end 131, it falls through the particulate inlet 132 into the elongated tube 43.

There is neither a particulate shield nor a guide portion in the second chamber 85 of the housing 70. As shown in FIG. 6, the only obstruction to particulate flow in the second chamber 85 is a portion of the drive shaft 92 which passes through the second chamber 85. Thus, if the sliding door 58 is fully opened, particulate flows freely from the discharge outlet 56 of the hopper through the second chamber 85 of the housing 70 and into the elongated tube 43 through the particulate inlet 132. Particulate passes through the second chamber 85 of the housing 70 without being metered by the metering cylinder 82.

As best shown in FIG. 3, each housing 70 has a plurality of transparent viewing windows 134 in its side wall 72 so that the particulate dropping from the metering cylinder 82 into the particulate inlet 132 of the tube 43 can be viewed during operation. Of course, the viewing windows 134 are sealably mounted in the side wall 72 to prevent leakage of particulate from the housing 70.

On its lower side, the elongated tube 43 has a discharge aperture 136 aligned under each particulate inlet 132. A door 138 covers the discharge aperture 136 when latch means 140 are engaged. The latch means 140 preferably comprises a plurality of standard flexible fasteners 142, with one end of each fastener 142 being pivotally secured at 144 to a first side of the door 138 and the other end being selectively mountable upon a pair of outstanding fingers 146 secured to the tube 43. A second side of the door 138 is pivotally mounted at 148 to the tube 43 so that when the latch means 140 is disengaged, the door will swing aside to uncover and open the discharge aperture 136. Particulate can thus be metered into the tube 43 through particulate inlet 132 from the housing 70 and directly out of the tube 43 through the discharge aperture 136. In addition, the hopper can be emptied by fully opening the sliding door 58 and the door 138 to permit particulate to fall freely through the housing 70 and tube 43. A suitable receptacle (not shown) can be provided under the door 138 to collect particulate emptied from the particulate feeder 20.

As stated, the rigid elongated tube 43 is the primary longitudinal portion of the main frame 30. As a structural member of the main frame 30, the tube 43 connects the laterally extending members 36 and 40 of the main frame 30 and supports the particulate feeder 20.

In operation, the elongated tube 43 is a portion of a particulate distribution system for dispensing particulate to the surface being worked. As best shown in FIG. 2, an air blower or fan 150 is mounted adjacent the rearward end 42 of the particulate feeder 20. The fan 150 is driven by conventional drive means, such as a gasoline engine 152 operably coupled to the fan by a drive belt 154. The fan 150 provides means for forcing air through the elongated tube 43 to provide a fluid medium for transporting particulate away from the hoppers and toward the surface being worked. Once the particulate has been metered into the elongated tube 43 of the distribution system, the air entrained particulate is then conveyed through the elongated tube 43 to a distribution tube 160. At least one distributor manifold is positioned downstream in the path of the distribution tube 160 to direct the particulate to a plurality of surface applicators.

A preferable arrangement for connecting the distribution system to the elongated tube 43 is shown in FIG. 1. The distribution tube 160 connects the elongated tube 43 to a primary manifold 162, which in turn distributes particulate to a plurality of secondary distribution tubes 164. Each secondary distribution tube 164 leads to a secondary manifold 166, which distributes the particulate to a plurality of applicator distribution hoses 168. As best shown in FIG. 9 (Sheet 1), each applicator distribution hose 168 is secured to a surface applicator 170 mounted on each separate tiller 29 to distribute particulate behind the path of each tiller 29.

While the primary manifold 162 and secondary manifolds 166 may differ in size and number of outlets, they are basically of the same design and construction. FIG. 10 shows an enlarged view of one of the secondary manifolds 166 with parts broken away for illustrative purposes. The manifold 166 is mounted on a flow tube 172 which is connected to the downstream end of one of the secondary distribution tubes 164 coming from the primary manifold 162. The flow tube 172, which is supported by a bracket means 174 on the frame 28 of the particulate distribution implement 22, thus constitutes an extension of the secondary distribution tube 164.

Each manifold 166 has a manifold head 176 having a lower end 177 and a rmovable impact plate 179 at an upper end 178 thereof closing a chamber within the manifold head 166. The manifold head 176 is sealably attached at its first end 177 to the flow tube 172 and the chamber is generally cylindrical in form about a generally vertical distribution axis adjacent the impact plate 179. A plurality of apertures or particulate outlets 180 (in the manifold head 176) are peripherally spaced apart relative to the distribution axis adjacent the impact plate 179, as shown in FIGS. 1 and 10.

Preferably, the manifold head 176 is cast as a unitary casting, with all internal surfaces and the outlets 180 being later machined. A hose mounting tube 182 is then fixedly secured adjacent each outlet 180 to provide an outlet mounting means for securing the applicator distribution hoses 168 to the manifold 166 by clamping means 184 as shown.

Prior art manifold heads were cast with the outlets and tube mounting in the casting. By later machining the outlets and adding the mounting rims, better tolerances are obtained with less casting imperfection and cost so that the flow of air and grain through the manifold is more efficient. Geometric balancing of the outlets about the distribution axis of the manifold prevents an imbalance in the feeding of particulate through the outlets. In addition, as long the outlets are geometrically balanced about the periphery of the manifold, any number of distribution tubes or hoses may be provided for simply by machining the desired number of apertures and attaching a similary number of mounting tubes. Thus, it is not necessary to remold extension castings to change the number and location of outlets on a manifold or block off selected existing outlets in a manifold to change the number of outlets coming from that manifold. The manifold head 176 of the present invention eliminates unbalanced row feeding caused by nonsymmetrical spacing of the outlets and eliminates casting imperfects on the interior surfaces of the manifold head 176 which tends to cause nonuniform particulate flow through the outlets.

To insure uniform and proper distribution of particulate behind each tiller 29, each applicator distribution hose 168 is secured to one of the surface applicators 170 (see FIG. 9, Sheet 1). Each surface applicator 170 is mounted to its respective tiller 29 by a mount bracket 189 so that the applicator will track the movement of its tiller 29. Each surface applicator 170 comprises a particulate drop tube 190 which has slanted upper and lower ends as shown in FIG. 10. Proximate its slanted upper end, the drop tube 190 has an outwardly protruding lip 191 and an adjustable clamp 192 positioned about the drop tube 190 (proximate the lip 191) for securing the applicator distribution hose 168 thereto. As shown, an end 194 of the applicator hose 168 is inserted into (and past) the slanted upper end of the drop tube 190 so that tightening of the adjustable clamp 192 deforms a portion of the hose 168 relative to the drop tube 190 to secure the hose 168 within the drop tube 190. The lower end of the drop tube 190 is slanted as shown to prevent it from being clogged by soil during operation.

Because of its unique construction and features, the particulate feeder 20 also provides means and methods for efficiently loading particulate therein. As shown in FIG. 11 (Sheet 4), the access door 54 of the rearward hopper 52 has two particulate ports 200 and 202. The fan 150 has an air intake opening 204 for sucking air into the fan 150 and through the distribution system. As shown, a vacuum tube 206 sealably connects the air intake opening 204 with the particulate port 200. When the sliding door 58 is in its second closed position over the particulate discharge outlet 56 of the hopper 52 (and all other openings in the hopper 52 except the ports 200 and 202 are closed) and the fan 150 is turned on, air is drawn from the hopper 25 through the vacuum tube 206 to create a vacuum in the hopper 52. An intake tube 208 is sealably connected at a first end 210 to the particulate port 202 on the hopper 52 and has its second end positioned in a loose accumulation of particulate so that the vacuum created in the hopper 52 draws the particulate through the intake tube 208 and into the hopper 52 to fill the hopper 52 with particulate to a desired level. The second end of the intake tube 208 can be positioned in a grain bin or, as shown, in a pile of particulate 210 carried in the bed of a mobile vehicle or truck 212. Of course, suitable screens or baffles (not shown) are provided adjacent the port 200 to prevent particulate from being sucked out of the hopper 52 and into the fan 150. It is thus apparent that the hoppers of the particulate feeder 20 can be refilled with particulate in the field very easily and quickly to permit minimal disruption of the application work being performed

CONCLUSION

The present invention provides an agricultural particulate feeder for controlling the rate of particulate distribution to a surface being worked which is much more versatile and easy to maintain then prior art devices. The particulate feeder meters particulate into a forced air distribution system by means of a dual control metering device. The metering device controls the amount of particulate passing into the distribution system by varying the size of the particulate outlet and by use of a metering cylinder which, depending on its speed of rotation, controls the particulate distribution rate. The metering device is generally encased in a housing, one side of which is removable to allow lateral access to the metering cylinder and sliding door. The agricultural particulate feeder is self-contained, movably supported on the ground and has suitable means for connecting the feeder to a prime mover and additional implements for use in distribution of the particulate.

Although the present invention has been described with reference to preferred embodiments, workers skilled in the art will recognize that changes may be made in form and detail without departing from the spirit and scope of the invention.

What is claimed is:

1. An agricultural implement adapted to be pulled longitudinally by a traction vehicle comprising a particulate feeder for controlling the rate of application of particulate to a surface being worked, the particulate feeder comprising;

a particulate hopper having a particulate discharge outlet at a lower end;

a sliding door over the discharge outlet, the sliding door being slidably variable in position to control the size of the particulate outlet;

a particulate metering cylinder rotatably mounted on a longitudinal axis under the sliding door;

means for rotating the metering cylinder;

a frame for supporting the particulate feeder, the frame having an elongated tube extending longitudinally under the hopper, and the tube having a particulate inlet aligned under the metering cylinder and discharge outlet;

a housing enclosing the metering cylinder and extending from the discharge outlet of the particulate hopper to the particulate inlet of the elongated tube to form an enclosure connecting the hopper discharge outlet and the tube particulate inlet;

said housing having a longitudinal side selectively removable from the housing for lateral access to the metering cylinder without interfering with metering cylinder rotation;

ground engaging means for movably supporting the frame; and air blower means for forcing air through the elongated tube to provide a fluid medium for transporting particulate away from the hopper and towards the surface being worked.

2. The agricultural implement of claim 1 wherein the metering cylinder rotating means comprises:

a cylinder drive shaft rotatably supported by bearings adjacent each end of the housing, the drive shaft passing slidably through the housing, the bearings, and the metering cylinder from its first end to its second end and being longitudinally removable so that upon withdrawal of the drive shaft the metering cylinder can be laterally removed from the housing, said metering cylinder being mounted on the drive shaft to rotate when the drive shaft rotates; and releasable drive means for rotating the cylinder drive shaft.

3. The agricultural implement of claim 2 wherein the cylinder drive shaft comprises:

a plurality of drive shaft sections; and a plurality of connecting collars securing the drive shaft sections end to end along a single longitudinal axis of rotation, the connecting collars being selectively removable and slidable on the drive shaft sections to facilitate longitudinal removal of the drive shaft.

4. The agricultural implement of claim 1 wherein the removing means comprises:

a panel removably mounted on one side of the housing.

5. The agricultural implement of claim 4 wherein the panel has a curved portion mounted on an inner side thereof for guiding particulate into engagement with the metering cylinder, and the panel being slidably adjustable on the housing for controlling the amount of particulate engaged by the metering cylinder.

6. The agricultural implement of claim 1 wherein the metering cylinder only extends across a first portion of the enclosure formed by the housing so that a second portion of the enclosure is open to allow particulate to pass through the housing without being metered by the metering cylinder.

7. The agricultural implement of claim 1 wherein the elongated tube has a discharge aperture and door therefor aligned under the particulate inlet of the tube.

8. The agricultural implement of claim 1 wherein the elongated tube is rigid and constitutes the main longitudinal portion of the frame supporting the particulate feeder.

9. The agricultural implement of claim 1 wherein the metering cylinder has a first end and a second end defining a longitudinal axis of rotation for the metering cylinder, and the metering cylinder has a plurality of elongated particulate troughs on an outer side extending from the first end of the metering cylinder to the second end of the metering cylinder.

10. The agricultural implement of claim 9 wherein the elongated troughs on the outer side of the metering cylinder are slanted relative to the longitudinal axis of rotation of the metering cylinder.

11. The agricultural implement of claim 1 and further comprising means for selectively moving the sliding door from a first open position to a second closed position.

12. The agricultural implement of claim 1 and further comprising a distribution system for dispensing the particulate to the surface being worked, and the distribution system being connected to the elongated tube by a distribution tube and having at least one manifold positioned in the distribution tube to direct the particulate to a plurality of surface applicators.

13. The agricultural implement of claim 12 wherein each surface applicator comprises:

a particulate drop tube, the drop tube having a slanted upper end and an outwardly protruding lip proximate thereto, the drop tube having an adjustable clamp positioned about the drop tube proximate the lip for securing a portion of the distribution system to the drop tube, the portion of the distribution system being constituted as an application hose inserted into the slanted end of the drop tube so that tightening of the clamp deforms the hose relative to the drop tube to secure the hose to the drop tube.

14. The agricultural implement of claim 12 wherein the manifold comprises:

a manifold head having a first end and a second end defining a distribution axis, the distribution tube being attached to the head at its first end, and the head having a plurality of apertures peripherally spaced apart relative to the distribution axis;

an impact plate being mounted on the head at its second end generally perpendicular to the distribution axis; and mounting means fixedly secured adjacent each aperture for forming an outlet mount for a securing additional portions of the distribution system to the manifold head.

15. The agricultural implement of claim 1 wherein the hopper has two particulate ports adjacent its upper end, the air blower means has an air intake opening, and further comprising:

a vacuum tube sealably connecting the air intake opening with one of the particulate ports so that when the air blower means is operated and the sliding door is moved to a closed position over the particulate discharge outlet of the hopper, air is drawn through the vacuum tube to create a vacuum in the hopper; and an intake tube sealably connected at a first end to the other particulate port on the hopper and having a second end positioned in a loose accumulation of particulates so that the vacuum created in the hopper draws the particulate through the intake tube and into the hopper to fill the hopper with particulate to a desired level.

* * * * *